United States Patent [19]

Hays et al.

[11] Patent Number: 5,388,233
[45] Date of Patent: Feb. 7, 1995

[54] METHOD AND APPARATUS FOR COUNTING INSTRUCTION TYPES USING BIT MASKS AND A PROGRAMMABLE BIT MAP

[75] Inventors: Kirk I. Hays, Hillsboro; Wayne D. Smith, Portland, both of Oreg.

[73] Assignee: Intel Corporation, Santal Clara, Calif.

[21] Appl. No.: 56,075

[22] Filed: Apr. 30, 1993

[51] Int. Cl.⁶ ............................................. G06F 9/30
[52] U.S. Cl. .................................................. 395/375
[58] Field of Search ............... 395/375, 775, 500, 550, 395/575

[56] References Cited

U.S. PATENT DOCUMENTS

| | | | |
|---|---|---|---|
| 4,485,480 | 11/1984 | Duff et al. | 395/550 |
| 4,602,330 | 7/1986 | Ikeya | 395/375 |
| 4,821,183 | 4/1989 | Hauris | 395/375 |
| 4,959,780 | 9/1990 | Miyoshi | 395/375 |
| 5,070,445 | 12/1991 | Woodward | 395/500 |
| 5,210,839 | 5/1993 | Powell et al. | 395/400 |
| 5,257,358 | 10/1993 | Cohen | 395/375 |
| 5,293,592 | 3/1994 | Fu et al. | 395/375 |

FOREIGN PATENT DOCUMENTS 63-020531  6/1988  Japan .
04-256039  1/1993  Japan .

*Primary Examiner*—Parshotam S. Lall
*Assistant Examiner*—Viet Vu
*Attorney, Agent, or Firm*—Blakely, Sokoloff, Taylor & Zafman

[57] ABSTRACT

A counter for counting instructions is implemented in a computer system having a processor in which instructions are fetched for potential execution. Each instruction is characterized by at least one instruction attribute. The counter includes at least one bit map register for storing a bit map. Each map bit position in the bit map represents a particular instruction attribute. Map bits at predetermined map bit positions are set. A bit mask register stores a bit mask corresponding to a fetched instruction. Each mask bit position in the bit mask represents a particular instruction attribute. A mask bit at a mask bit position is set if the mask bit position represents an instruction attribute of the fetched instruction. Logic circuitry increments a count value associated with a bit map based upon a comparison of the bit map with the bit mask.

35 Claims, 4 Drawing Sheets

FIGURE 2A

| BIT MAP | | | |
|---|---|---|---|
| COUNTER | OPCODE | ADDRESS MODE | REGISTERS | EXECUTE |

FIGURE 2B

| BIT MAP | | | |
|---|---|---|---|
| COUNTER | 000...010 | 0|001 | 0|00100001 | 1|0 |

FIGURE 2C

MOV B, A (NOT EXECUTED)

| BIT MASK | | | |
|---|---|---|---|
| 000...010 | 0|001 | 1|00000000 | 1|0 |

FIGURE 2D

MOV R₁, A (EXECUTED)

| BIT MASK | | | |
|---|---|---|---|
| 000...010 | 0|001 | 0|00000001 | 0|1 |

METHOD AND APPARATUS FOR COUNTING INSTRUCTION TYPES USING BIT MASKS AND A PROGRAMMABLE BIT MAP

BACKGROUND OF THE INVENTION

1. Field of the Invention

The present invention relates to data processing systems, and more particularly to counting predetermined instructions fetched and/or executed by a processor.

2. Description of the Prior Art and Related Information

In designing computer hardware and software, designers find it useful to measure performance characteristics of the computer system so that deficiencies may be diagnosed and corrected, and performance otherwise maximized. For example, the designer may wish to count the number of trap instructions indicating that a floating point result has gone out of range and determine where in the program code this error is occurring. If a particular section of code results in the execution of an excessive number of trap instructions, that section may need to be modified. Counting of other instructions is also useful in optimizing system performance.

One prior art performance measuring technique uses software to single step through the application program being tested. Each instruction is fetched and decoded. Control is then transferred back to a monitoring program, which compares the decoded opcode to a predetermined opcode taken from a predefined set of opcodes. If a match is found, a counter associated with the matched opcode from the set is incremented. After the monitoring program has completed this procedure, control is turned back to the application program for fetching and decoding of the next instruction. Shuttling back and forth between monitoring and execution of application programs degrades execution speed.

One hardware technique that is used to count the type of instructions being executed relies upon a special bit included in the instruction set. For example, in some processors a single bit flag in the opcode is set to indicate that the opcode represents a floating point instruction. At the decode stage, logic in the decode unit increments a counter every time it detects this flag. This method can be expanded to include any type of instruction, but is limited in that it requires modification of the instruction set to include the flag bits.

Another hardware technique counts processor events. One processor chip manufactured by Intel Corporation, the assignee of the present invention, includes a set of control registers that can be programmed to specify the events to be counted, such as cache misses, floating point operations, or the execution of branch instructions. Each time a predetermined event occurs, a counting register is incremented. For example, if floating point operations are to be counted, during execution of instructions the processor determines whether the floating point arithmetic logic unit and associated control structures are being utilized. To count branching operations, the processor determines whether the instruction pointer is being incremented in a non-sequential manner.

Based on the foregoing, the prior art clearly exhibits a number of drawbacks. Using performance monitoring software to single step through the application program drastically slows system performance. As for the first hardware technique, that method requires flag bits to be added to the opcode for each parameter to be measured, thereby limiting the instruction codes that are to be counted by the available opcode length. Finally, the technique utilized by the prior art Intel chip requires that logic circuitry monitor different areas of the chip to determine what events are occurring during execution.

It would be desirable to have a more flexible and comprehensive means for counting instructions being fetched by a processor. The prior hardware methods are limited to counting the type of instructions being executed, e.g., floating point instructions. However, designers would benefit by knowing what particular instructions within a type are present. For example, a count of executed floating point add, subtract and multiply instructions would permit the megaflop rate of the code to be calculated. In addition, by counting individual instructions, one can also determine whether certain instructions are never executed and thus may be eliminated from the instruction set.

Using information concerning individual instructions, the designer could also easily perform test coverage analysis by running an application program that executes every instruction. By comparing the count for each instruction with the number of times that instruction occurs in the code, the designer could determine whether the instructions are executing properly.

SUMMARY OF THE INVENTION

The present invention is a counter for counting instructions in a computer system in which each instruction is characterized by at least one instruction attribute. The computer system includes a processor in which instructions are fetched for potential execution. Instruction attributes include characteristics of the instruction, such as the instruction opcode, the instruction addressing mode, the registers specified by the instruction, and whether the fetched instruction has been executed, among other attributes. A bit map register stores a bit map comprising at least one map bit position. Each map bit position represents a particular instruction attribute with map bits at predetermined map bit positions being set. A bit mask register stores a bit mask corresponding to a fetched instruction. A bit mask comprises at least one mask bit position. Each mask bit position represents a particular instruction attribute. A mask bit at a mask bit position is set if the mask bit position represents an instruction attribute of the fetched instruction. Logic circuitry increments a count value associated with a bit map based upon a comparison of the bit map with the bit mask.

BRIEF DESCRIPTION OF THE DRAWINGS

The object, features and advantages of the present invention will be apparent to one skilled in the art in light of the following detailed description in which:

FIGS. 2A–2D are bit maps and bit masks of another embodiment of the present invention.

DETAILED DESCRIPTION OF THE INVENTION

The present invention provides a method and apparatus for counting instructions fetched and/or executed by a processor using a programmable bit map. For purposes of explanation, specific embodiments are set forth to provide a thorough understanding of the present invention. However, it will be apparent to one skilled in the art that the invention may be practiced without these details. In other instances, well known elements, devices, process steps and the like are not set forth in detail to avoid unnecessarily obscuring the present invention.

The present invention counts predetermined parameters relating to the structure and execution of an instruction by assigning each parameter a unique bit position in a bit map. A set of bit maps are stored in bit map registers located on the CPU chip. As an instruction is fetched and/or executed, a bit mask comprised of bits each representing the presence or absence of a given parameter is formed. The bit mask is ANDed with each bit map in the set of bit map registers and each result is logically compared to the bit mask. If a result is identical to the bit mask, then a counter associated with the corresponding bit map is incremented.

Figure 1A:
FIGS. 1A–1C are bit maps and bit masks of one embodiment of the present invention.

FIG. 1A is an illustration of the format of a simple bit map and its associated counter. In this embodiment, the bit map has two fields—one representing instruction opcodes and the other representing instruction addressing modes.

Figure 1B:
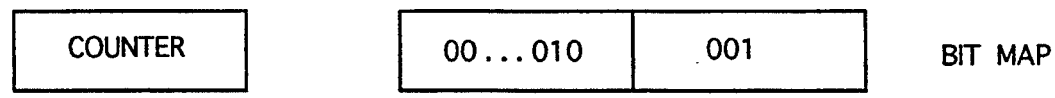
Figure 1B:
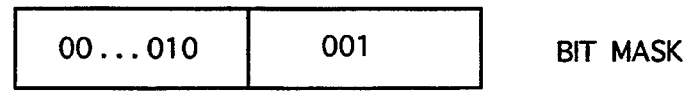

FIG. 1B illustrates a bit map used to count all MOV instructions that use direct addressing. Here, the MOV instruction is represented by the opcode 00 . . . 010, and direct addressing is represented by the code 001 in the ADDRESS MODE field. Note that each opcode and each addressing mode maps to a single bit within their respective fields. In other words, the second bit in the OPCODE field designates the MOV instruction, and the first bit in the ADDRESS MODE field designates direct addressing.

During decoding of an instruction, the bit mask associated with that instruction is formed. Referring again to FIG. 1B, the bit mask created during decoding of the instruction MOV A, B would have the form shown in FIG. 1B. Because the MOV A,B instruction is a MOV instruction using direct addressing, its bit mask is identical to the bit map in FIG. 1B. To determine whether an instruction is one to be counted by the counter associated with a particular bit map, the present invention ANDs the bit map with the bit mask and compares the result to the bit mask. Here, the bit map and the bit mask are identical, and thus the ANDed result is identical to the bit mask, resulting in incrementation of the counter associated with that bit map.

Figure 1C:
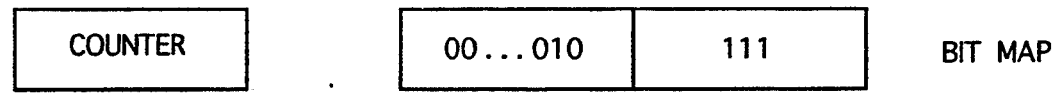

The flexibility of the present invention is exemplified in the bit map of FIG. 1C. Again, the bit map is set up to count MOV instructions. Here, however, all bits in the ADDRESS MODE field are set to one, indicating a DON'T CARE or identity state, meaning that all MOV instructions for any addressing mode will be counted. When this bit map is ANDed with the bit mask of FIG. 1B the result again is identical to the bit mask, causing the counter to be incremented.

FIGS. 2A, 2B and 2C illustrate the operation of an expanded version of the bit map of the present invention used to count more parameters relating to the structure and execution of a fetched instruction. The bit map of FIG. 2A includes a REGISTER field and an EXECUTE field, as well as the OPCODE and ADDRESS MODE fields of the bit map of FIG. 1A. The REGISTER field permits the user to determine whether a particular register or combination of registers is to be accessed by an instruction. The EXECUTE field allows counting of the number of times a fetched instruction is actually executed.

In this embodiment, the ADDRESS MODE, REGISTER and EXECUTE fields all contain a NOP (no operation) bit in the most significant bit position of each of those fields. The NOP bit allows the user complete flexibility to determine all the possible combinations of operations that may or may not occur using the parameters within a given field. For example, each of the eight least significant bits in the REGISTER field of FIG. 2B indicates whether a particular internal CPU register is to be accessed by an instruction. If the user desires to count each time a particular instruction accessed any register, and did not care whether a particular register were being accessed, then the user would set all eight least significant bits in the bit map REGISTER field to one. Thus, if any of the eight least significant bits in the REGISTER field of the bit mask of FIG. 2C were set, then, if all the other fields matched, the counter would be incremented. However, without the NOP bit, if the user were to specify in the bit map that one or more registers were to be counted yet the actual instruction represented by the bit mask in fact accessed no registers, the result of the ANDing of the bit map and the bit mask would still lead to all zeros in the least significant eight bits of the REGISTER field, thus incorrectly resulting in incrementation of the counter even though no registers were accessed.

To avoid this error condition, the present invention includes the NOP bit in the most significant bit position of the REGISTER field of the bit map and the bit mask. If no registers are to be accessed, then the NOP bit is set to one. As shown in FIGS. 2B and 2C, when the user desires to count register accesses but no registers are in fact accessed by the decoded instruction, then the ANDing of the zero NOP bit in the bit map with the one NOP bit in the bit mask results in a zero bit. This zero bit is not equal to the one bit in the NOP position in the bit mask, and thus, correctly, the instruction is not counted. If the user does not care whether registers are accessed or not, then the user would set all bits in the REGISTER field of the bit map, including the NOP bit, to one to form an identity field. When this identity field is ANDed with the REGISTER field of the bit mask the result is identical to the bit mask REGISTER field, resulting in incrementation of the counter (assuming all other bit map and bit mask fields also match). This concept extends to other fields in the bit map and the bit mask. For example, the most significant bit of the ADDRESS mode field is a NOP bit, allowing the user the flexibility to count instructions utilizing any and all combinations of addressing modes, including those that use no addressing at all.

Attention is now directed to the EXECUTE fields of FIGS. 2B and 2D. Note that the OPCODE, ADDRESS MODE, and REGISTER fields of the bit masks are built during the decode stage of the instruction cycle because all the information necessary to build those fields is available after decoding. However, it is desirable to know whether the instruction fetched and decoded is actually executed. This information is available only after passing through the execution stage of the instruction cycle. Thus, the EXECUTE field of the bit mask is not formed until after passing through that stage. The least significant bit of the EXECUTE field of the bit map specifies that executed instructions are to be counted, while the most significant bit indicates that only fetched instructions not ultimately executed are to be counted. Similarly, the least significant bit of the bit mask specifies that execution has taken place, while the most significant bit indicates that although the instruction has been fetched and decoded, it has not been executed.

In the bit map of FIG. 2B the EXECUTE field contains the bits 10 representing that instructions not executed after passing through the execution stage are to be counted. However, in the bit mask of FIG. 2D the EXECUTE field contains the bits 01, indicating that the MOV instruction was in fact executed after passing through the execution stage. When the EXECUTE field bits of the bit map and bit mask are ANDed together the logical result does not match the EXECUTE field of the bit mask, and thus the MOV instruction is not counted as an instruction that was not executed. Note that if the user does not care whether a particular instruction is executed or not, the bits in the execute field are simply set to 11, representing a DON'T CARE or identity state.

The ability to count when instructions are fetched but not executed is very useful to the system designer. A fetched instruction may not be executed if, for example, the code branches to an instruction other than the fetched instruction or the processor handles an interrupt. Using the present invention, the designer may insert watch points in the application program. At each watch point, the program can be instructed to read the counters associated with particular bit maps that count the number of instructions fetched but not executed within a particular section of code preceding the watchpoint. In this manner, the designer can diagnose whether the fetch-to-execute ratio of a section of code indicates that that code section is branching excessively, resulting in wasteful fetching of many of the fetched instructions. With this knowledge, the designer can optimize the compiler to reconfigure the order in which instructions are branched so that inefficient branching is minimized.

Figure 3:
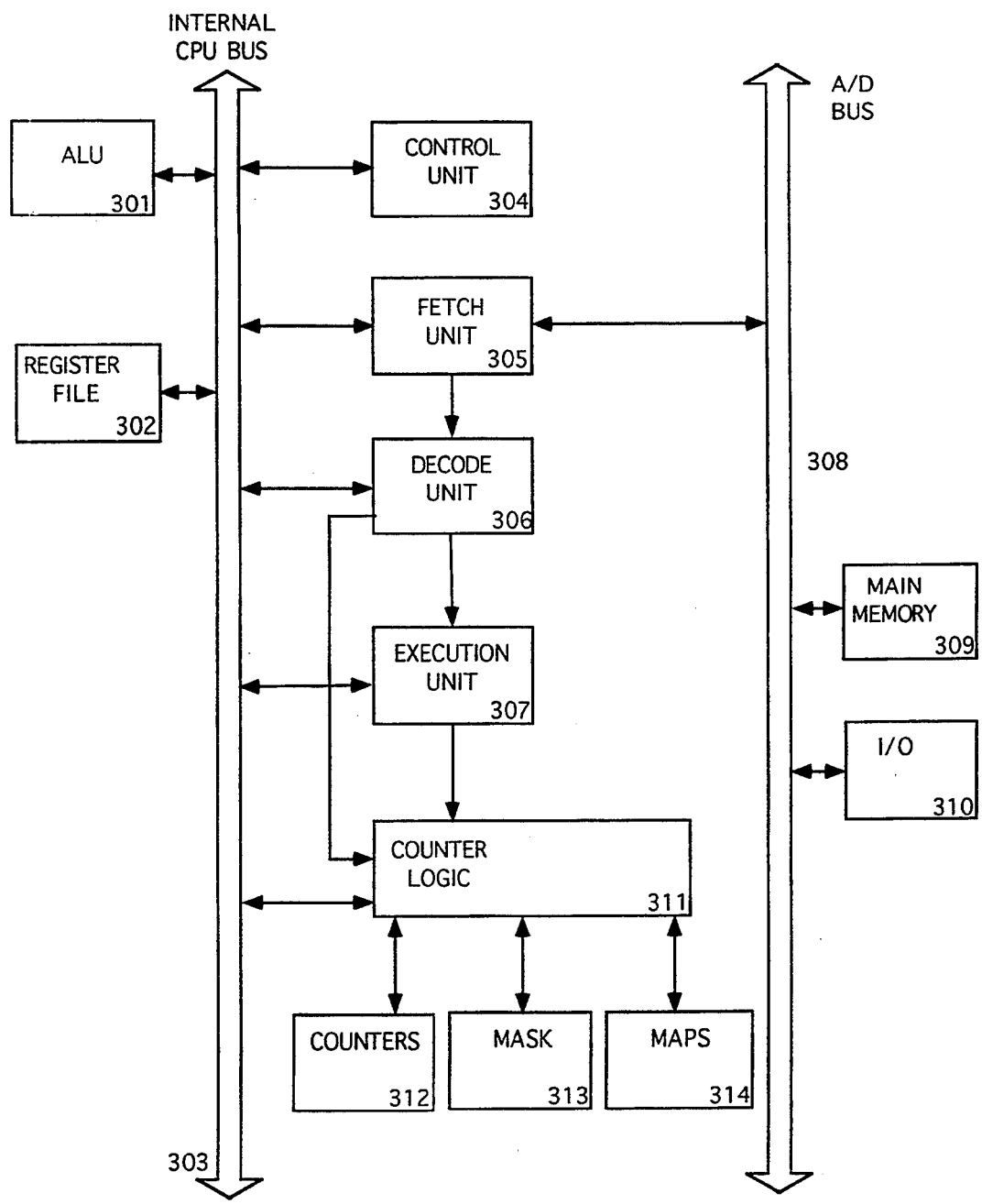
FIG. 3 is an illustration of the present invention in the context of a processor.

FIG. 3 illustrates the present invention in the context of a CPU. The CPU consists of an arithmetic logic unit (ALU) 301 coupled to a register file 302 and an internal CPU bus 303. A CPU control unit 304, a fetch unit 305, a decode unit 306 and an execution unit 307 are also coupled to the CPU bus 303. The fetch unit 305 is coupled to an address/data bus 308 from which the fetch unit 305 obtains instructions from main memory 309. The fetch unit 305 feeds the fetched instructions to decode unit 306, which in turn passes the instructions to execution unit 307. An input/output device 310 is also coupled to address/data bus 308.

The present invention comprises counter logic 311, which is coupled to counters 312, bit mask register 313 and bit map registers 314. In order to build the bit mask, the counter logic 311 receives information regarding the fetched instructions from decode unit 306, and information indicating whether the fetched instruction has been executed from execution unit 307. The counter logic 311 also receives control signals from the control unit 304 over bus 303. Counter logic 311 receives bit map programming information over address/data bus 308, and allows reading of the counters 312 over bus 308.

Figure 4:
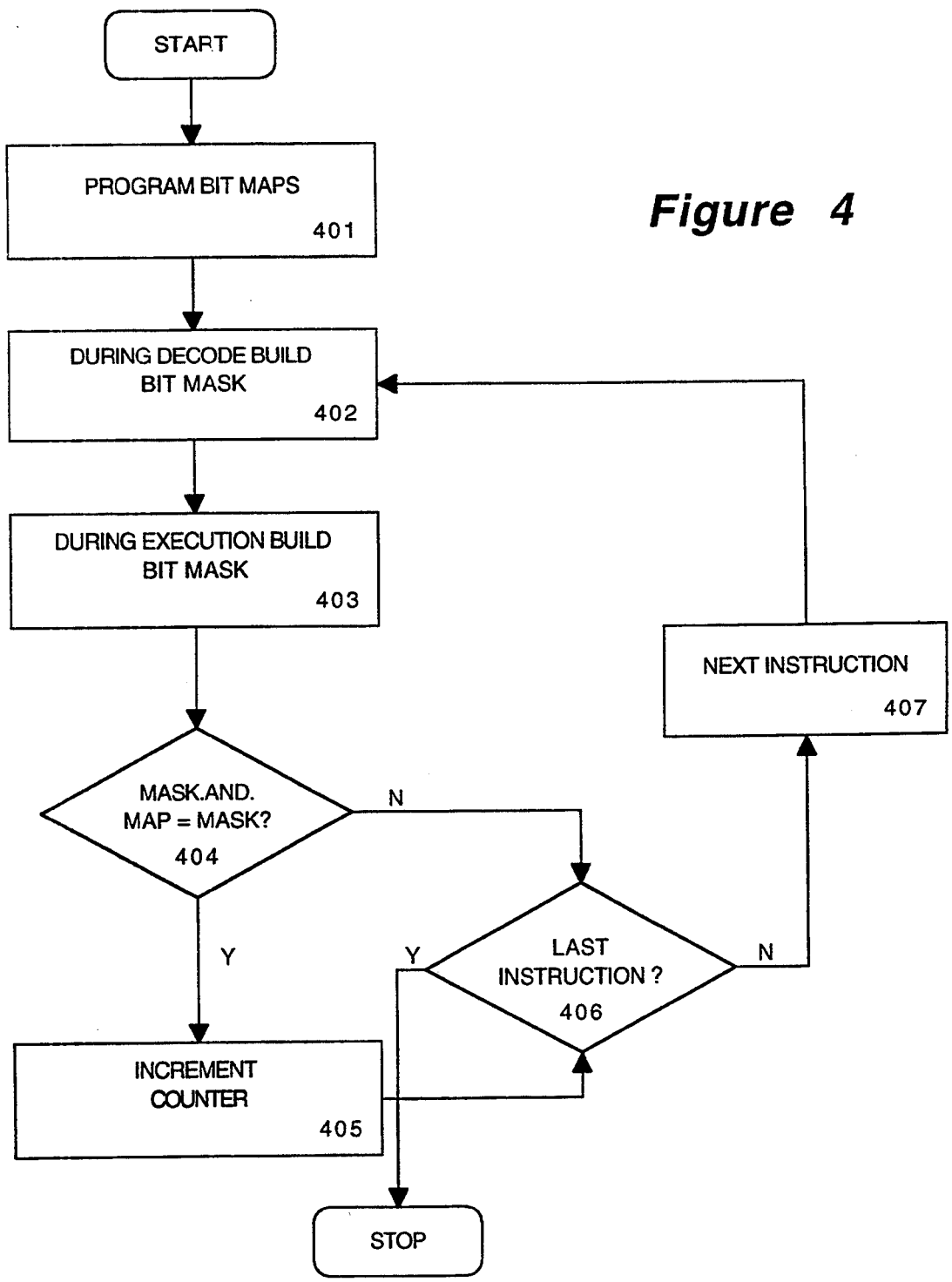
FIG. 4 is a flowchart diagramming the method of the present invention.

The operation of the present invention will now be explained with reference to FIG. 3 and to FIG. 4, a flowchart of the method of present invention. The invention permits programming of the bit maps, which may be implemented using a number of techniques, including memory mapping, I/O mapping and programmed memory (Step 401). It would be obvious to one skilled in the art that bit map programming would not be limited to these techniques and that other methods may be used as well.

Using memory mapping a block of main memory addresses are reserved as the addresses of the bit maps in bit map register set 314. Through counter logic 311 the user can write bit patterns to the bit maps at these addresses as if the user were simply writing to main memory. In a manner similar to using mapped memory, a block of I/O port addresses may be reserved as the addresses of the bit maps in bit map register set 314. The bit maps are programmed through counter logic 311 using the instructions for writing to those I/O ports. Programming can also be implemented using nonvolatile memories such as an EPROM to hold the set of bit map registers 314.

After the bit maps have been programmed, the user can start running the application program to count instruction types. In the embodiment of FIG. 2A, the information necessary to create the OPCODE, ADDRESS MODE and REGISTER fields is available during the decoding stage from decode unit 306 of FIG. 3. Counter logic unit 311 examines the decoded instruction, segregates this information and builds the bit mask for those fields in bit mask register 313 (Step 402). During the execution stage of the instruction cycle, the execution unit 307 feeds a signal to the counter logic unit 311 indicating whether the fetched instruction is to be executed. Accordingly, counter logic 311 sets the appropriate bits of the EXECUTE field in the mask register 313 during the execution stage (Step 403).

After the bit mask has been created for an instruction, counter logic 311 ANDs the mask in parallel with all bit maps in the bit map register set 314, and compares the logical result with the bit mask in bit mask register 313 (Step 404). If the comparison is true for a particular bit map, then the map logic increments the counter associated with that bit map (Step 405). If not, the present invention proceeds to the next instruction as long as the current instruction was not the last instruction in the code sequence being read (Steps 406, 407).

Although the use of bit maps and bit masks to perform the functions of the present invention is not obvious, the design of the counter logic and associated circuitry would be obvious to one skilled in the art who is informed of the functions to be performed. The counter logic may be implemented using an application specific integrated circuit (ASIC) or programmable logic array, for example.

After the instruction types within a desired section of code have been counted, the user can read out the information from registers contained in the counters 312. The counters may be addressed using the same address mapping techniques used to program the maps 314, e.g., main memory address mapping or I/O port address mapping. This information can be graphically displayed as part of a debugging program to show information such as the instruction type count and the execution/fetch ratio for sections of the application program delimited by watch points inserted into the program. Using this information, the system designer can optimize the compiler for programs similar to the application program run through the debugger and the data set used by that program. For example, if two instructions are found to have similar counts, further analysis may reveal that the two instructions are always paired together, thus suggesting that they be collapsed into a single, more efficient instruction in a modified instruction set.

Although the invention has been described in conjunction with various embodiments, it will be appreciated that modifications and alterations might be made by those skilled in the art without departing from the spirit and scope of the invention.

What is claimed is:

1. In a computer system having a processor in which instructions are fetched for potential execution, a counter for counting instructions in which each instruction is characterized by at least one instruction attribute of a plurality of instruction attributes, said counter comprising:

at least one bit map storage means for storing a bit map comprising at least one map bit position, each map bit position representing an instruction attribute;

setting means for setting at least one map bit at at least one predetermined map bit position before instruction decoding;

bit mask storage means for storing a bit mask corresponding to one of said fetched instructions, said bit mask comprising at least one mask bit position, each mask bit position representing an instruction attribute, a mask bit at a corresponding mask bit position being set if said mask bit position represents an instruction attribute of said fetched instruction; and incrementing means for incrementing a count value associated with said at least one bit map based upon a comparison of said at least one bit map with said bit mask.

2. The counter of claim 1, wherein:

each instruction attribute belongs to a corresponding attribute set, each bit map comprises at least one map field, each map field associated with one of said attribute sets and each map field comprising at least one map bit position, said bit mask comprises at least one mask field, each mask field is associated with one of said map fields and each mask field comprises at least one mask bit position, each mask bit position corresponding to one of said map bit positions such that each mask bit position and its corresponding map bit position correspond to the same instruction attribute; and said incrementing means comprises means for incrementing said count value associated with said at least one bit map if, for all map fields within said bit map, at at least one of said predetermined map bit positions within each map field, the mask bit at the mask bit position corresponding to said at least one of said predetermined map bit positions is set.

3. The counter of claim 1, wherein a plurality of main memory addresses are dedicated to said at least one bit map storage means, said map bit positions being set using main memory write operations.

4. The counter of claim 1, wherein a plurality of input/output port addresses are dedicated to said at least one bit map storage means, said map bit positions being set using input/output write operations.

5. The counter of claim 1, wherein said at least one bit map storage means is disposed in programmable memory.

6. The counter of claim 2, wherein a first of said attribute sets is a set of opcodes available for execution by said fetched instruction, each said instruction attribute of said first attribute set being a particular opcode.

7. The counter of claim 6, wherein each instruction attribute of a second attribute set is a particular addressing mode available to said fetched instruction.

8. The counter of claim 7, said second attribute set further comprising an instruction attribute denoting that no addressing mode is to be used by said fetched instruction.

9. The counter of claim 6, wherein each instruction attribute of a second of said attribute sets denotes a CPU register accessible by said fetched instruction.

10. The counter of claim 9, said second attribute set further comprising an instruction attribute denoting that no CPU register is to be accessed by said fetched instruction.

11. The counter of claim 6, wherein a second of said attribute sets comprises a first instruction attribute denoting that said fetched instruction has been executed and a second instruction attribute denoting that said fetched instruction has not been executed.

12. The counter of claim 1, wherein said incrementing means comprises:

means for ANDing said bit mask with said at least one bit map to produce a logical result, said logical result associated with said at least one bit map;

means for determining whether said bit mask and the logical result associated with said at least one bit map are identical; and means for incrementing said count value associated with said at least one bit map if the means for determining determines that the bit mask and the logical result associated with said at least one bit map are identical.

13. In a computer system having a processor in which instructions are fetched for potential execution, a counter for counting instructions in which each instruction is characterized by at least one instruction attribute of a plurality of instruction attributes, said counter comprising:

at least one bit map register for storing a bit map comprising at least one map bit position, each map bit position representing an instruction attribute;

setting logic for setting at least one map bit at at least one predetermined map bit position before instruction decoding;

a bit mask register for storing a bit mask corresponding to one of said fetched instructions, said bit mask comprising at least one mask bit position, each mask bit position representing an instruction attribute, a mask bit at a corresponding mask bit position being set if said mask bit position represents an instruction attribute of said fetched instruction; and incrementing logic for incrementing a count value associated with said at least one bit map based upon a comparison of said at least one bit map with said bit mask.

14. The counter of claim 13, wherein each instruction attribute belongs to a corresponding attribute set, each bit map comprises at least one map field, each map field associated with one of said attribute sets and each map field comprising at least one map bit position, said bit mask comprises at least one mask field, each mask field is associated with one of said map fields and each mask field comprises at least one mask bit position, each mask bit position corresponding to one of said map bit positions such that each mask bit position and its corresponding map bit position correspond to the same instruction attributes; and said incrementing logic comprises logic for incrementing said count value associated with said at least one bit map if, for all map fields within said bit map, at at least one of said predetermined map bit positions within each map field, the mask bit at the mask bit position corresponding to said at least one of said predetermined map bit positions is set.

15. The counter of claim 13, wherein a plurality of main memory addresses are dedicated to said at least one bit map register, said map bit positions being set using main memory write operations.

16. The counter of claim 13, wherein a plurality of input/output port addresses are dedicated to said at least one bit map register, said map bit positions being set using input/output write operations.

17. The counter of claim 13, wherein said at least one bit map register is disposed in programmable memory.

18. The counter of claim 14, wherein a first of said attribute sets is a set of opcodes available for execution by said fetched instruction, each said instruction attribute of said first attribute set being a particular opcode.

19. The counter of claim 18, wherein each instruction attribute of a second attribute set is a particular addressing mode available to said fetched instruction.

20. The counter of claim 19, said second attribute set further comprising an instruction attribute denoting that no addressing mode is to be used by said fetched instruction.

21. The counter of claim 18, wherein each instruction attribute of a second of said attribute sets denotes a CPU register accessible by said fetched instruction.

22. The counter of claim 21, said second attribute set further comprising an instruction attribute denoting that no CPU register is to be accessed by said fetched instruction.

23. The counter of claim 18, wherein a second of said attribute set comprises a first instruction attribute denoting that said fetched instruction has been executed and a second instruction attribute denoting that said fetched instruction has not been executed.

24. The counter of claim 13, wherein said incrementing logic comprises:
a parallel ANDing logic circuit for ANDing said bit mask with said at least one bit map to produce a logical result, said logical result associated with said at least one bit map;
a comparator for determining whether said bit mask and the logical result associated with said at least one bit map are identical; and
a counting logic circuit for incrementing said count value associated with said at least one bit map if the means for determining determines that the bit mask and the logical result associated with said at least one bit map are identical.

25. A computer system comprising:
main memory means for storing instructions;
fetching means for fetching instructions from said main memory means for potential execution;
system bus means for coupling said main memory means to said fetching means;
counting means for counting said instructions, wherein each instruction is characterized by at least one instruction attribute of a plurality of instruction attributes, said counting means having:
at least one bit map storage means for storing a bit map comprising at least one map bit position, each map bit position representing an instruction attribute;
setting means for setting at least one map bit at at least one predetermined map bit position before instruction decoding;
bit mask storage means for storing a bit mask corresponding to one of said fetched instructions, said bit mask comprising at least one mask bit position, each mask bit position representing an instruction attribute, a mask bit at a corresponding mask bit position being set if said mask bit position represents an instruction attribute of said fetched instruction;
incrementing means for incrementing a count value associated with said at least one bit map based upon a comparison of said at lest one bit map with said bit mask.

26. A computer system comprising:
a main memory for storing instructions;
a fetching unit for fetching instructions from said main memory for potential execution;
a system bus for coupling said main memory to said fetching unit;
a counter for counting said instructions, wherein each instruction is characterized by at least one instruction attribute of a plurality of instruction attributes, said counter having:
at least one bit map register for storing a bit map comprising at least one map bit position, each map bit position representing an instruction attribute;
setting logic for setting at least one map bit at at least one predetermined map bit position before instruction decoding;
a bit mask register for storing a bit mask corresponding to one of said fetched instructions, said bit mask comprising at least one mask bit position, each mask bit position representing an instruction attribute, a mask bit at a corresponding mask bit position being set if said mask bit position represents an instruction attribute of said fetched instruction;
incrementing logic for incrementing a count value associated with said at least one bit map based upon a comparison of said at least one bit map with said bit mask.

27. In a computer system having a processor in which instructions are fetched for potential execution, a method for counting instructions in which each instruction is characterized by at least one instruction attribute of a plurality of instruction attributes, said method comprising the steps of:
programming at least one bit map by setting at least one predetermined map bit of said at least one bit map, each map bit occupying a map bit position, each map bit position representing an instruction attribute;
setting at least one mask bit of a bit mask, each mask bit occupying a mask bit position, each mask bit position representing an instruction attribute, said at least one mask bit being set if said mask bit position represents an instruction attribute of said fetched instruction;

incrementing a count value associated with said at least one bit map based upon a comparison of said at least one bit map with said bit mask.

28. The method of claim 27, wherein each instruction attribute belongs to a corresponding attribute set, each bit map comprises at least one map field, each map field associated with one of said attribute sets and each map field comprising at least one map bit position, said bit mask comprises at least one mask field, each mask field associated with one of said map fields and each mask field comprising at least one mask bit position, each mask bit position corresponding to one of said map bit positions such that each mask bit position and its corresponding map bit position correspond to the same instruction attribute;

said incrementing step comprising the step of incrementing said count value associated with said at least one bit map if, for all map fields within said at least one bit map, at at least one of said predetermined map bit positions within each map field, the mask bit at the mask bit position corresponding to said at least one of said predetermined map bit positions is set.

29. The counter of claim 28, wherein a first of said attribute sets is a set of opcodes available for execution by said fetched instruction, each said instruction attribute of said first attribute set being a particular opcode.

30. The counter of claim 29, wherein each instruction attribute of a second attribute set is a particular addressing mode available to said fetched instruction.

31. The counter of claim 30, said second attribute set further comprising in instruction attribute denoting that no addressing mode is to be used by said fetched instruction.

32. The counter of claim 29, wherein each instruction attribute of a second of said attribute sets denotes a CPU register accessible by said fetched instruction.

33. The counter of claim 32, said second attribute set further comprising an instruction attribute denoting that no CPU register is to be accessed by said fetched instruction.

34. The counter of claim 29, wherein a second of said attribute sets comprises a first instruction attribute denoting that said fetched instruction has been executed and a second instruction attribute denoting that said fetched instruction has not been executed.

35. The method of claim 27, said incrementing step comprising the steps of:

ANDing said bit mask with said at least one bit map to produce a logical result, said logical result associated with said at least one bit map;

determining whether said bit mask and the logical result associated with said at least one bit map are identical; and incrementing the count value associated with said at least one bit map if the means for determining determines that the bit mask and the logical result associated with said at least one bit map are identical.

* * * * *

UNITED STATES PATENT AND TRADEMARK OFFICE
CERTIFICATE OF CORRECTION

PATENT NO. : 5,388,233
DATED : February 7, 1995
INVENTOR(S) : Hays et al.

It is certified that error appears in the above-identified patent and that said Letters Patent is hereby corrected as shown below:

In column 9, at line 43, delete "attribute set" and substitute --attribute sets--.

In column 12, at line 5, delete "in" and substitute --an--.

Signed and Sealed this

Twenty-ninth Day of October 1996

Attest:

BRUCE LEHMAN

Attesting Officer    Commissioner of Patents and Trademarks